United States Patent [19]

Hein et al.

[11] 4,127,486
[45] Nov. 28, 1978

[54] APPARATUS FOR THE PRESSURE IMPINGEMENT OF A PRESSURE FILTRATION CELL

[75] Inventors: Wolfgang Hein; Claus Cosack, both of Dassel; Peter Grundmann, Konigswinter, all of Germany

[73] Assignee: Carl Schleicher & Schull, Einbeck, Germany

[21] Appl. No.: 827,429

[22] Filed: Aug. 24, 1977

[30] Foreign Application Priority Data

Dec. 16, 1976 [DE] Fed. Rep. of Germany ....... 2657030

[51] Int. Cl.² .......................................... B01D 29/38
[52] U.S. Cl. .................................. 210/219; 210/238; 210/410; 210/414; 210/416 L
[58] Field of Search .................. 210/19, 65, 219, 238, 210/258, 409, 410, 413, 414, 416 R, 416 DW, 416 L, 416 M

[56] References Cited

U.S. PATENT DOCUMENTS

| 607,523 | 7/1898 | Pierce et al. | 210/410 |
| 626,991 | 6/1899 | Eberhard | 210/416 R X |
| 751,810 | 2/1904 | Rice | 210/416 R |
| 1,354,604 | 10/1920 | Duggan | 210/19 |
| 1,692,393 | 11/1928 | Striffler | 210/416 R |
| 2,436,077 | 2/1948 | Robertson | 210/416 DW X |
| 3,055,208 | 9/1962 | Gallus | 210/416 R X |

FOREIGN PATENT DOCUMENTS

| 1,023,335 | 3/1966 | United Kingdom | 210/416 |
| 1,385,706 | 2/1975 | United Kingdom | 210/409 |

*Primary Examiner*—Robert H. Spitzer
*Attorney, Agent, or Firm*—Burns, Doane, Swecker & Mathis

[57] ABSTRACT

A pressure filtration cell includes a reservoir for liquid to be filtered, a filter at the bottom of the reservoir, and a manually actuable pump for supplying compressed air. The pump is detachable from the reservoir. The air is introduced near the bottom of the reservoir closely adjacent the filter so as to create turbulence in the liquid and across the filter. The turbulence is of a pulsating nature due to the intermittent operation of the pump. Thus, the pump is easily portable for use anywhere and creates a "dynamic" filtration process even without a mechanical stirrer. If used in a laboratory, the cell can be provided with a rotary, magnetically operated stirrer mounted on a relatively short axle.

5 Claims, 1 Drawing Figure

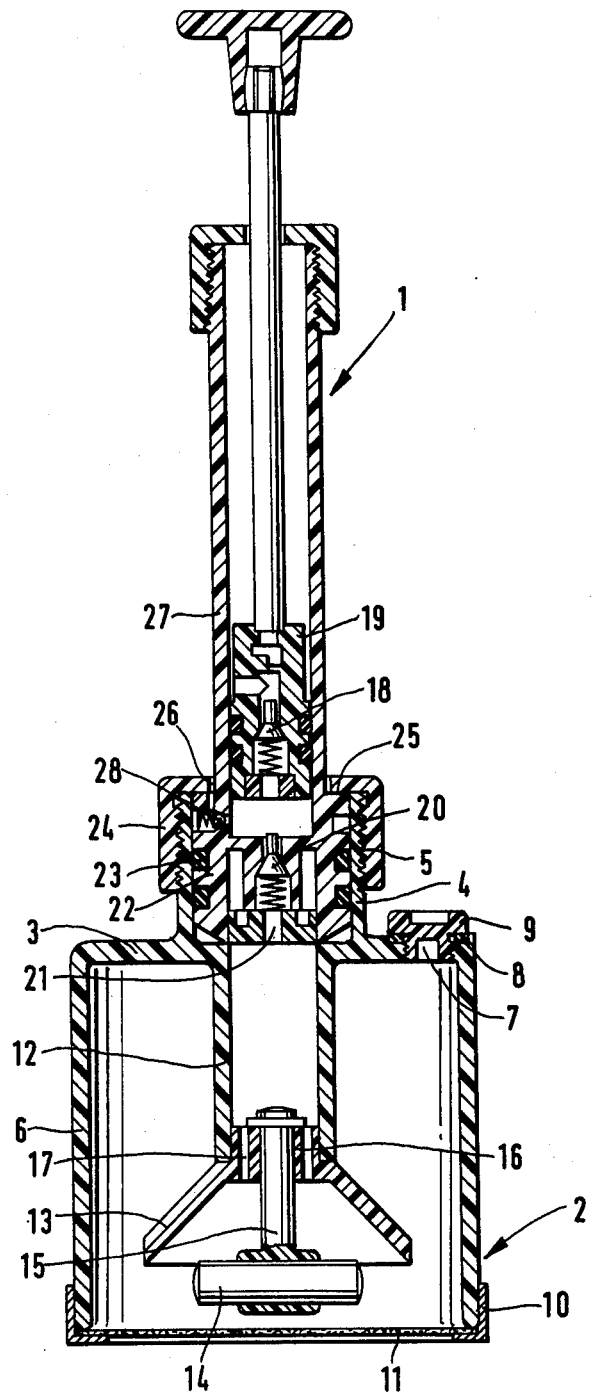

APPARATUS FOR THE PRESSURE IMPINGEMENT OF A PRESSURE FILTRATION CELL

BACKGROUND AND OBJECTS OF THE INVENTION

The invention relates to the filtering of liquids and, more particularly to an apparatus for the pressure injection of gas, usually air, into a pressure filtration cell.

In the case of customary pressure filtration cells, compressed gas is forced into the top of a container cell by way of a non-return valve. The gas thus enters a pressure gas chamber of the pressure filtration cell above the liquid that is to be filtered. Pressure build-up in the cell above the liquid forces the liquid through a filter located at an outlet of the cell. Sources of compressed gas have heretofore comprised compressed gas cylinders with constant, or at least practically constant, gas pressure. In order to control the dynamic filtration conditions on the filter surface and in the medium to be filtered, a magnet stirrer can be fixed in the cell freely rotatably above the filter surface. This stirrer is situated on a long shaft mounted at the lid or dome of the pressure filtration cell. The magnetic stirrer is turned by a rotating guide magnet disposed below the cell to mix the liquid and thereby create "dynamic" filtering conditions.

It is a disadvantage in the case of instruments such as these that they are suitable only for use in the laboratory but not for example, outdoors in the area of protection of the environment. Without a strong rotating guide magnet, these pressure filtration cells would operate under "static" filtration conditions and would result in considerably less filtrating performance. Moreover, the customary cells depend on a compressed gas source which according to its nature is locally fixed.

In the case of the customary pressure filtration cells, furthermore, the partly very long stirrer shaft, especially in the case of larger cells, which require greater driving forces and thus coupling forces for the stirring mechanism, is disadvantageous. A fairly stable support and mounting of the small stirring rod is extremely costly.

The invention is based on the object of creating an apparatus of the initially mentioned type, which makes possible dynamic pressure filtration independent of the locale, i.e., it can be performed indoors or outdoors as well.

It is another object of the invention to provide a portable pressure filtration cell.

It is a further object of the invention to provide a pressure filtration cell having a hand-actuating, separably detachable pressurizing mechanism.

BRIEF SUMMARY OF THE PREFERRED EMBODIMENT

A piston-slide air compressor pump is connected releasably with a lid of a pressure filtration cell. At the same time a cylindrical connector part is molded onto the lid of the cell. A piston-like head of the air compressor pump is sealingly inserted into the connector part. The attachment of the pump is accomplished by way of a cap screw which can be screwed onto the outside thread of the connector part and cooperates with its frontal underside with an upper shoulder of the head of the pump. Whenever the air compressor pump is no longer needed for the large pressure filtration cell, it can be removed with one easy manipulation and is inserted into a smaller cylinder which, for example, serves for the sucking in of liquid that is to be filtered. Then a smaller filter holder may be screwed onto such cylinder. Thus, the air pump may be exchangeable, for one thing against low pressure filtration cells (approximately 0.5–2.5 l. infusion volume). For another thing, it may be used for small pressure filtration medii with an infusion volume in the range of 5–50 ml.

Another feature of the invention involves a gas discharge immersion pipe of the cell being shaped conically and opening downwards. As a result of that, the turbulence effect on the filter surface occurs effectively on the entire filter surface. In case of such a development of the mouth of the immersion pipe moreover, a small magnetic stirrer may be mounted freely rotatably directly in the immersion pipe opening. This small stirrer preferably only has a very short axle journal. The latter is mounted on a radial element in the immersion pipe in the area of its transition from the cylindrical part of the immersion pipe to its conical opening mouth. At the same time, the radial element is shaped in such a way or is equipped in such a way with bores that the free passage of compression gas will not be unduly impeded.

A pressure filtration device developed in such a way may be used both independently of any kind of source of supply outdoors, as well as in the laboratory with additional use of a magnetic stirrer mechanism. At the same time, as a result of the manner of arranging the immersion pipe, a high degree of turbulence of the medium that is to be filtered will be achieved in the pressure filtration cell.

By the use of an air compressor pump for the pressure impingement, again not only the independence on the place of the pressure filtration device is made possible, but as a result of the cyclic pumping and repressing of the compressed gas, a very effective discontinuous or pulsating supply of compressed gas is obtained by way of the immersion pipe, which leads to an effective turbulence of the medium to be filtered and of the medium deposited on the filter surface.

In the case of the development of the pump head as an outside piston, an exceedingly high compatability of the system for the air compressor pump may be achieved.

Finally, as a result of the development of the shaft bearing the magnetic stirrer, as only a short axle journal, one may not only guarantee a noticeable lessening of the production costs but also an essential stabilization of the mounting of the small stirrer.

THE DRAWING

The invention will be explained in more detail in the following paragraphs on the basis of a preferred embodiment and in connection with the drawing. The only FIGURE shows in a non-scale-like presentation in longitudinal cross-section of a preferred embodiment of the invention.

DETAILED DESCRIPTION OF A PREFERRED EMBODIMENT OF INVENTION

The apparatus shown schematically in the FIGURE in axial cross-section essentially comprises an air compressor pump 1 and a pressure filtration cell 2. The pressure filtration cell 2 includes a lid 3 on which is disposed a cylindrical connector part 4. This part 4 is open toward the top of the cell and is integrally molded with the cell 2. The connector part 4 is equipped with an outside thread 5 and serves for the mounting of the air compressor pump 1.

In the lid 3, which is of one integral piece with a cylindrical skirt-like part 6 of the pressure filtration cell 2, a fill port 7 is provided for inserting into the cell the medium that is to be filtered. Afterward, the port 7 may be hermetically closed by a gasket 8 with a closing screw 9. The bottom or outlet end of the pressure filtration cell 2 is connected with a filter holder 10 in conventional pressure resistant and fluid sealing manner. The holder 10 carries a conventional filter 11.

On the inside of the lid 3 is disposed an essentially cylindrical immersion pipe 12 projecting into the cell 2. This pipe 12 is integral with the lid 3 and forms a gas conducting extension of the connector part 4. Disposed on a lower end of the pipe 12 is a gas discharge cone 13 which has a downwardly open discharge. The discharge opening of the mouth cone 13 lies parallel to the filter 11 and is disposed immediately above the surface of the filter, i.e., closely adjacent thereto. Thus, even in the case of a small volume of liquid in the cell, a good turbulence of the liquid medium that is to be filtered may be achieved by the compression gas forced into the cell via the immersion pipe. In the FIGURE, these close tolerance conditions, for the sake of a clearer presentation, are not rendered to scale, but are shown axially displaced somewhat from one another.

In order to be able to control the dynamic filtration conditions even more effectively in laboratory operations, as opposed to outside conditions, the pressure filtration cell has additionally been equipped with a magnetic stirrer 14 which is disposed in the opening area of the cone 13. The magnetic stirrer 14 is freely rotatable closely above the surface of the filter 11, and is mounted on a short axle journal 15. The head of the axle journal 15 is mounted rotatably in the immersion pipe, on a radial bottom part 16. This bottom part 16 is located in the area of transition between the cylindrical pipe 12 and the cone 13. The bottom part 16 is provided with axial bores 17, which ensure a free passage of the compressed gas from the cylindrical part of the immersion pipe 12 into the conical part 13.

The magnetic stirrer 14 is rotatable by a guide magnet disposed, for example, below a drip pan for the filtrate, or in any other conventional manner. As will become apparent, the magnetic stirrer is not an essential feature of the present invention, but is preferably used whenever possible, such in a laboratory environment, to enhance stirring of the medium being filtered.

The air compressor pump 1 is a piston slide pump. This pump includes a reciprocable piston 19 and a one-way inlet valve 18 in the piston 19. The piston 19 is slidable within a cylindrical sleeve-like housing 27 which terminates in a piston-shaped head 22. This head 22 includes a pressure conduit 21 which communicates with the immersion pipe 12. The head may be inserted into the connector part 4 and sealed therein by gaskets 23. A one-way outlet valve 20 is provided in the head 22 within the pressure conduit 21 to allow pressurized gas to enter the cell 2 during a pressure stroke of the pump. A screw cap 24 may be screwed onto the outside thread 5 of the connector part 4. This cap 24 acts upon a shoulder 25 of the head 22 and thus creates a stable, rigid connection between the air compressor pump 1 and the pressure filtration cell 2. The screw cap 24 encloses the cylinder 27 of the air compressor pump 1, with clearance leaving an annular gap 26. This gap ensures the escape of excess pressure from a safety valve 28 in the head 22. Upon exceeding a critical threshold pressure in the pressure filtration cell (or in the pressure chamber of the air compressor pump), the valve 28 may relieve the pressure chamber of the air compressor pump between the inlet valve 18 and the outlet valve 20.

A pressure filtration cell of the previously described type serves mainly for the filtration of larger volumes of liquid with an infusion volume of about 0.5 to 2.5 l. The liquid that is to be filtered is inserted through the fill port 7 into the pressure filtration cell 2. Subsequently, the closing screw 9 is tightened hard upon the gasket 8.

As a result of reciprocable operation of the piston 19 of the air compressor pump 1, air, or some other compression gas, is intermittently and cyclically pumped via the outlet valve 20, the pressure conduit 21, the immersion pipe 12, the bores 17 and the cone 13 into the pressure filtration cell at a level below the top of the liquid that is to be filtered. In case of every pressure stroke, the forced-in operating gas is pressed out in the form of bubbles along the lower outside edge of the cone 13. The bubbles rise through the liquid that is to be filtered and then collect above the level of the liquid in a pressure gas chamber. In so doing, a turbulence and mixing of the liquid that is to be filtered occurs. This action is eminently suitable for the filtration process. The filtering performance will be greatly enhanced by this intermittent (pulsating) or timed injecting of the compression gas.

By forcing the gas from a cone, closely adjacent the filter, it is assured that agitation will also occur along a substantial portion of the face of the filter.

The gas pressure then builds up gradually above the level of the liquid and finally forces the liquid through the filter 11 out of the cell. As a result, the volume of the compressed gas chamber in the pressure filtration cell is enlarged, so that the gas pressure in such chamber will also drop. It must be increased again by repumping. As a result, the desired turbulence is again produced in the liquid to be filtered. In this way, it will finally be possible to subject the entire liquid to a dynamic pressure filtration without there being any need for any kind of additional auxiliary means, such as a compressed gas source or mechanical stirring, for the operation of the device. The device therefore is completely operable independently of the locale where located and it is suitable particularly for examinations outdoors.

In the case of laboratory operation, the magnetic stirrer 14 may be driven via a magnetic drive. As a result of the additional mixing by the magnetic stirrer, naturally the effectiveness of the turbulence will be increased. However, by virtue of the present invention, even in the absence of mechanical stirring such as this, the pressure cell may be operated under completely sufficient, so-called dynamic filtration conditions, i.e., filtering while stirring up the medii being filtered.

Thus, a major advantage of the present invention is that the medium being filtered can be agitated during the pressure discharge process, even absent mechanical stirring. Thus, "dynamic" filtering effects can be achieved independently of a laboratory. Consequently, the device is portable in the sense that it can be taken outdoors (there is no need for pressure tanks due to the hand pump). In addition, there occurs agitation across a substantial part of the filter surface. The pulsating-type agitation which occurs has been found to be particularly effective for the filtering performance.

An additional major advantage of the preferred embodiment of the invention lies in the manner of the exchangeable attachment of the air compressor pump 1 on the pressure filtration cell 2. The air compressor pump 1 is a rigid durable unit which may also be used, after only a few manipulations, for the pressure filtration of smaller volumes of liquids. For that purpose, it will merely be necessary to unscrew the screw cap 24 from the thread 5 and pull the piston 22 out of the connector part 4. The head 22 then needs only to be inserted in a smaller cylinder and the screw cap 24 needs only to be screwed onto such cylinder. Then the liquid that is to be filtered may be aspirated into this smaller aspiration cylinder, as in the case of a sprayer, by retraction of the head 22 within the cylinder. After screwing a filter holder onto such cylinder, the pressure filtration may take place by operation of the piston 19 of the air compressor pump 1 even for the smallest volumes of liquid. The air pump 1 which serves for the pressure injection of the relatively large pressure filtration vessel 2, may therefore be used, on the basis of its special attachment to the pressure filtration cell 2, by a few manipulations, for the pressure filtration of even the smallest quantities of liquid.

In the case of the manufacture of the parts of pressure resistant plastic, the apparatus according to the invention will make possible the production of only a few 100 g of heavy pressure filtration systems completely independent on the locale. This makes possible the pressure filtration and ultra filtration of liquid volumes in the range from about 10–2500 ml. under dynamic filtration conditions.

A further advantage of the invention is that the magnetic stirrer requires only a short axle.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A pressure filtration apparatus comprising:
   a gas compressor pump having a pressure outlet and a one-way valve in said outlet;
   a cell for receiving medium to be filtered, said cell including:
   a filtered outlet,
   a lid connected with said pump, and
   gas conducting means communicating with said outlet, said gas conducting means comprising an immersion pipe communicating with said outlet and a cone at the bottom of said immersion pipe;
   said cone including a gas outlet disposed at the bottom of said cell above and closely adjacent said filter.

2. Apparatus according to claim 1 wherein a journal axle is mounted at the transition between said immersion pipe and said cone without completely blocking the passage of gas therethrough, and a magnetic stirrer is mounted on a lower end of said axle for rotation above said filter.

3. Apparatus according to claim 2 wherein said pump is removably connected to said cell.

4. Apparatus according to claim 3 wherein said cell further comprises a cylindrical connector part integral with said lid and having an external thread; said pump including a piston-like head received in said connector part; and a screw cap screwable onto said connector part for retaining said head therein.

5. Apparatus according to claim 1 wherein said pump is removably connected to said cell.

* * * * *